United States Patent Office 3,835,080
Patented Sept. 10, 1974

3,835,080
PROCESS FOR THE PREPARATION OF AQUEOUS POLYOXYMETHYLENE DISPERSIONS
Karlheinz Burg, Langenhain, Taunus, Hans Dieter Hermann, Neuenhain, Taunus, and Helmut Schlaf, Kelkheim, Taunus, Germany, assignors to Farbwerke Hoechst Aktiengesellschaft vormals Meister Lucius & Bruning, Frankfurt am Main, Germany
No Drawing. Filed May 3, 1972, Ser. No. 250,073
Claims priority, application Germany, May 4, 1971, P 21 21 887.1
Int. Cl. B29c 1/04; C08g 1/14, 1/22; D06m 15/30
U.S. Cl. 260—29.2 R                           2 Claims

ABSTRACT OF THE DISCLOSURE

Polyoxymethylenes are dispersed in water by suspending polyoxymethylene particles in water and then comminuting the particles of the suspension, the polyoxymethylene thus being directly dispersed. For the direct dispersion there are used polyoxymethylenes having hydrophilic groups, for example, carboxylate groups. Aqueous polyoxymethylene dispersions thus prepared are suitable for the preparation of coatings, in particular for paper and textiles.

---

The present invention relates to a process for the preparation of aqueous polyoxymethylene dispersions.

Aqueous polymer dispersions can generally be prepared easily by way of emulsion polymerization of the respective monomers. However, this method cannot be applied in many cases, owing to the sensitivity to water of the initiators or monomers to be used. In these cases, it is therefore necessary to disperse the polymers in water after their preparation. Thus, it has been proposed to disperse polyolefins in an aqueous medium containing emulsifying agents and, optionally, protective colloids, and to eliminate the solvent, or—according to a two-stage process— to grind the polyolefins first and to disperse them subsequently in water (see Belgian Pat. No. 561,459).

The only method known so far to prepare aqueous polyoxymethylene dispersions includes mixing solutions of polyoxymethylenes in organic solvents with water, while stirring, and eliminating the solvents afterwards by distillation (see French Pat. No. 2,012,454).

The present invention provides a process for the preparation of an aqueous dispersion of a polyoxymethylene having a reduced specific viscosity of from 0.05 to 2.0 dl./g. and containing hydrophilic groups, wherein the polyoxymethylene is suspended in water in a fine-grained form, and is then mechanically comminuted and finely dispersed.

With respect to the present invention, the term "polyoxymethylenes" and comprises homo- or copolymers of formaldehyde or of trioxane containing recurring oxymethylene units of the formula —OCH$_2$— in a preponderate amount, having a molecular weight within a determined range, and containing at least one hydrophilic group per polymer molecule.

The molecular weights of the polyoxymethylenes used according to the invention are expressed by the reduced specific viscosity (RSV value), which is measured with a solution of 0.5 g. of the polymer in 100 ml. of γ-butyrolactone containing 2% by weight of diphenylamine as a stabilizer, at a temperature of 140° C. The reduced specific viscosity of the polyoxymethylenes is in the range of from 0.05 to 2.0 dl./g., preferably from 0.1 to 1.5 dl./g.

Preference is given to polyoxymethylenes containing salt-like groups, which are dissociable in water, preferably carboxylate groups. The above-mentioned polyoxymethylenes are prepared by copolymerizing formaldehyde or trioxane with monomer compounds which acts as comonomers or chain transfer agents, and which contain either directly salt-like groups dissociable in water, or radicals that can be converted into those groups. The proportion of the said ionic groups in the polymer molecule is generally in the range of from 0.1 to 50, preferably from 0.5 to 10%, calculated on the number of acetal groups of the polymer.

As comonomers there are suitable, above all, carboxylic or sulfonic acid esters and lactones which are copolymerizable with formaldehyde or trioxane. Particularly suitable are esters of primary aliphatic alcohols having from 1 to 8, preferably from 1 to 4, carbon atoms, with monobasic aliphatic or aromatic carboxylic acids having up to 11 carbon atoms, preferably up to 7, which include an epoxy ring, a hydroxyl group, or a formal grouping. As an example, there may be mentioned the methyl, ethyl, propyl, butyl, and octyl esters of glycidic acid, glycidoxybenzoic acid, glycolic acid or lactic acid, bis(glycolic acid ester)-formals, such as bis(glycolic acid methyl ester)-formal, as well as β-propiolactone.

The polyoxymethylenes used according to the invention are prepared in known manner by way of catalytic polymerization of the monomer(s), and, if necessary, by the subsequent formation of the salt-like groups dissociable in water. The preparation of modified polyoxymethylenes having hydrophilic groups in the polymer chain thereof is disclosed in French Pat. No. 2,012,454 and its counterpart British Specification No. 1,270,335.

In order to prepare the dispersions, the above-mentioned polyoxymethylenes are suspended in water and are mechanically comminuted by means of grinding mills or stirrer mills, while being finely dispersed at the same time. As mills, there are suitable virtually all kinds of stirrer ball mills or ball roller mills. As stirrers there are preferably used those running at a high speed, i.e. stirrers having a speed of at least 10,000 r.p.m.

The period of time used for the comminuting and dispersing processes depends on the nature of the apparatus used and varies between 15 minutes and 12 hours. The comminuting and dispersing processes are carried out without the application of an overpressure, generally at a temperature in the range of from 15 to 30° C.; they are usually carried out at room temperature.

The average particle size of the polyoxymethylenes used according to the invention, which are present in a pulverulent form or in the form of grit, is generally from 15 to 50 microns, preferably from 25 to 35 microns. The average particle size of the polyoxymethylene particles present in the dispersion is in the range of from 0.1 to 15 microns, preferably from 0.5 to 10 microns.

The solids content of the dispersions obtained according to the invention is from 1 to 35, preferably from 5 to 30% by weight; it may be adjusted by a direct weighing-in of the polyoxymethylenes used.

The use of an emulsifying agent is generally not necessary. However, in some cases it may be advantageous to use an emulsifying agent in a common concentration, for example, from 0.1 to 20, preferably from 0.5 to 10% by weight, calculated on the polymer. Suitable are the common non-ionic emulsifying agents, in particular reaction products of aliphatic alcohols, for example, lauryl, stearyl or oleyl alcohol, with from 1 to 50, preferably from 10 to 20 moles of ethylene oxide per mole of alcohol, moreover, condensation products of alkylated phenols, for example, octyl, nonyl, or tri-sec.-butyl phenol with from 1 to 50, preferably from 10 to 20 moles of ethylene oxide per mole of phenol. Besides, there are suitable ionic emulsifying agents, particularly salts of carboxylic or sulfonic acids, or salts of sulfuric acid semi-esters, for example, potassium oleate, sodium stearate, sodium, lauryl sulfate and sodium dodecyl sulfate, or the alkali salts of the sulfuric acid semi-esters of the above-mentioned ethylene oxide addition compounds. Besides, the common protective colloids, for example, sodium alginate, polyvinyl alcohol or carboxymethyl cellulose may also be used, in a concentration of from 0.1 to 5, preferably from 0.5 to 3% by weight, calculated on the polymer.

The dispersions prepared according to the invention are suitable for the manufacture of coatings, for the coating of paper and textiles, and as mould release agents.

The following Examples serve to illustrate the invention.

EXAMPLE 1

(a) 0.5 part by weight of boron trifluoride dibutyl etherate in 2 parts by weight of cyclohexane was added to 100 parts by weight of a mixture consisting of 81% by weight of trioxane, 10% by weight of 1,3-dioxolane and 9% by weight of glycolic acid methyl ester, with the exclusion of moisture and air. After 3 hours at a temperature of 70° C., the solid polymer block obtained was ground. The polyoxymethylene was then dissolved, at a pressure of 12 atmospheres gage, in 10 times the amount of 60% by weight aqueous methanol containing 1% by weight of borax. After 30 minutes, at a temperautre of 150° C., the reaction mixture was cooled, while stirring, in which process the stabilized and saponified polyoxymethylene precipitated. After filtration, the polyoxymethylene was washed with 50% by weight methanol and was dried; its reduced specific viscosity was 0.11 dl./g., and the size of the polyoxymethylene particles was from 15 to 35 microns.

(b) 10 parts by weight of the polyoxymethylene obtained according to (a) were suspended in 90 parts by weight of water, and the suspension was stirred for 15 minutes by means of a high-speed stirrer with about 10,000 r.p.m., while maintaining a temperature of about 20° C. The aqueous dispersion obtained was passed through a 100 micron sieve. The polyoxymethylene particles showing an irregular form had a particle diameter of from 1 to 10 microns. The solids content corresponded to the weighed-in amount of 10% by weight. The dispersion remained stable for several weeks.

EXAMPLE 2

30 parts by weight of the polyoxymethylene prepared according to Example 1(a) were ground, together with 70 parts by weight of water, in a porcelain ball roller mill for 12 hours at a temperature of about 20° C. and were dispersed. The diameter of the balls used was 1 centimeter. The aqueous dispersion obtained was separated from the balls by means of a coarse sieve and was then passed through a 100 micron sieve. The dispersed polyoxymethylene particles had a particle diameter of from 1 to 7 microns. The dispersion having a solids content of 30% by weight remained stable for several weeks.

EXAMPLE 3

20 parts by weight of a polyoxymethylene prepared according to Example 1(a) consisting of 87 parts by weight of trioxane, 3 parts by weight of 1,3-dioxolane 10 parts by weight of glycolic acid methyl ester formal and having a reduced specific viscosity of 0.14 dl./g. and an average particle size of 20 microns were mixed in 80 parts by weight of water with 150 parts by weight of glass beads (diameter of 1 to 2 millimeters), were then ground for 1 hour in a stirrer ball mill at 1,200 r.p.m. and were subsequently dispersed. The dispersion obtained was separated by means of a 100 micron sieve. The size of the dispersed particles was in the range of from 0.1 to 3 microns. The dispersion having a solids content of 20% by weight did not deposit even after several weeks.

What is claimed is:

1. A process for the preparation of an aqueous dispersion of a polyoxymethylene having a reduced specific viscosity of from 0.05 to 2.0 dl./g. and containing hydrophilic groups which comprises forming fine-grained solid particles of polyoxymethylene having an average particle size of 15 to 50 microns and carboxylate groups dissociable in water along the polymer chain thereof, said groups being present in the polymer molecule in the range of 0.1 to 50%, based on the number of acetal groups of said polyoxymethylene, suspending said particles in water, and mechanically comminuting the particles of said suspension to form a stable, aqueous dispersion of said polyoxymethylene having an average particle size within the range 0.1 to 15 microns.

2. The process of Claim 1, wherein the polyoxymethylene is used in an amount of from 1 to 35% by weight, calculated on the total amount of the dispersion.

References Cited

UNITED STATES PATENTS

| 3,432,483 | 3/1969 | Peoples et al. | 260—29.2 R |
| 3,491,050 | 1/1970 | Keberle et al. | 260—29.2 TN |
| 3,437,624 | 4/1969 | Dawn et al. | 260—29.2 TN |
| 3,627,850 | 12/1971 | Hafner et al. | 260—823 |

FOREIGN PATENTS

| 2,012,454 | 3/1970 | France | 260—92.2 R |
| 1,270,335 | 4/1972 | Great Britain | 260—29.2 R |
| 676,155 | 12/1963 | Canada | 260—29.2 U |

MURRAY TILLMAN, Primary Examiner

H. KOECKERT, Assistant Examiner

U.S. Cl. X.R.

117—139.5 CQ; 252—8.9; 260—67 FP; 264—338